United States Patent
Liu et al.

(10) Patent No.: US 9,031,060 B2
(45) Date of Patent: May 12, 2015

(54) VOICE OVER INTERNET PROTOCOL SYSTEM AND METHOD

(71) Applicant: Hon Hai Precision Industry Co., Ltd., New Taipei (TW)

(72) Inventors: Chia-Hao Liu, New Taipei (TW); Da-Cheng Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/787,844

(22) Filed: Mar. 7, 2013

(65) Prior Publication Data

US 2014/0140339 A1 May 22, 2014

(30) Foreign Application Priority Data

Nov. 21, 2012 (TW) .............................. 101143393 A

(51) Int. Cl.
  *H04L 12/66* (2006.01)
  *H04L 29/06* (2006.01)
  *H04L 29/12* (2006.01)

(52) U.S. Cl.
  CPC ......... *H04L 65/1073* (2013.01); *H04L 61/1511* (2013.01); *H04L 61/00* (2013.01)

(58) Field of Classification Search
  CPC .................................................. H04L 65/1073
  USPC ................................................. 370/352, 356
  See application file for complete search history.

(56) References Cited

U.S. PATENT DOCUMENTS

| | | | |
|---|---|---|---|
| 6,873,854 B2 | 3/2005 | Crockett et al. | |
| 2005/0220082 A1* | 10/2005 | Toyoda | 370/352 |
| 2005/0238156 A1 | 10/2005 | Turner | |
| 2006/0023657 A1* | 2/2006 | Woodson et al. | 370/328 |
| 2007/0076695 A1* | 4/2007 | Chu et al. | 370/352 |
| 2008/0189437 A1* | 8/2008 | Halley | 709/245 |
| 2010/0146062 A1* | 6/2010 | Eriksson | 709/206 |
| 2011/0142035 A1* | 6/2011 | Ku et al. | 370/352 |
| 2012/0207152 A1* | 8/2012 | Chang | 370/356 |
| 2012/0307993 A1* | 12/2012 | Masters | 379/142.04 |
| 2013/0225213 A1* | 8/2013 | Antypas, III | 455/466 |
| 2014/0056293 A1* | 2/2014 | Kumar et al. | 370/338 |

FOREIGN PATENT DOCUMENTS

TW            201234813 A1    8/2012

* cited by examiner

*Primary Examiner* — Farah Faroul
(74) *Attorney, Agent, or Firm* — Novak Druce Connolly Bove + Quigg LLP

(57) ABSTRACT

A voice over internet protocol (VOIP) system and method are provided. The VOIP method includes steps of generating a phone number for a first terminal device, and a domain name corresponding to that phone number, transmitting the domain name and an internet protocol (IP) address to a dynamic domain name service (DDNS) server for registration, applying the same procedure to second and third terminal devices, generating a name of a group for the first, second, and third terminal devices, generating a domain name corresponding to the name of the group, and transmitting the domain name and the IP address for registration, and acquiring the domain name for the required name of the group, thus allowing calls to be made and available within the group.

14 Claims, 3 Drawing Sheets

VOICE OVER INTERNET PROTOCOL SYSTEM AND METHOD

BACKGROUND

1. Technical Field

The present disclosure relates to voice communications systems and, particularly, to a voice over internet protocol (VOIP) system and a method.

2. Description of Related Art

In a prior art, when an VOIP phone A is called by another VOIP phone B, and the user of the VOIP phone A is not available to answer the call, another user can help the user of the VOIP phone A to receive the call. However, if a distance between another user and the VOIP phone A is far away, it is very inconvenient for the another user to get the VOIP phone to receive the call.

Therefore, what is needed is a new voice over internet protocol system and method to overcome the above described limitations.

DETAILED DESCRIPTION

Figure 1:
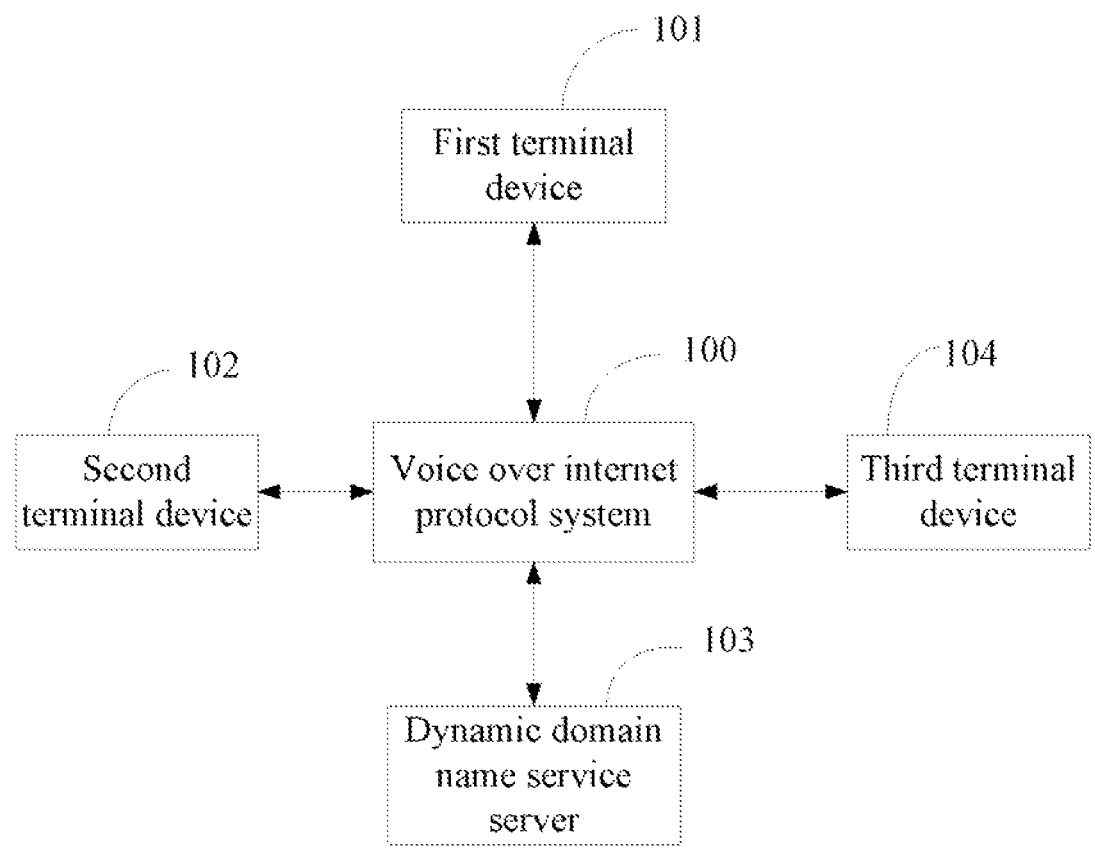
FIG. 1 is a schematic diagram of a voice over internet protocol system which is applied to a first terminal device, at least one second terminal device, at least one third terminal device, and a dynamic domain name service server, in accordance with an exemplary embodiment.

Referring to FIG. 1, a VOIP system 100 which is applied to a first terminal device 101, at least one second terminal device 102, at least one third terminal device 104 and a dynamic domain name service (DDNS) server 103 is provided. In one embodiment, the first terminal device 101, the at least one second terminal device 102 and the at least one third terminal device 104 may be Internet-capable phones, notebook computers, desktop computers, or the like. It should be noted that the terminal devices 101, 102, and 104 may be directly connected to a VOIP network without an integrated access device (IAD) if each of the terminal devices 101, 102, and 104 have a function of accessing the VOIP network.

Figure 2:
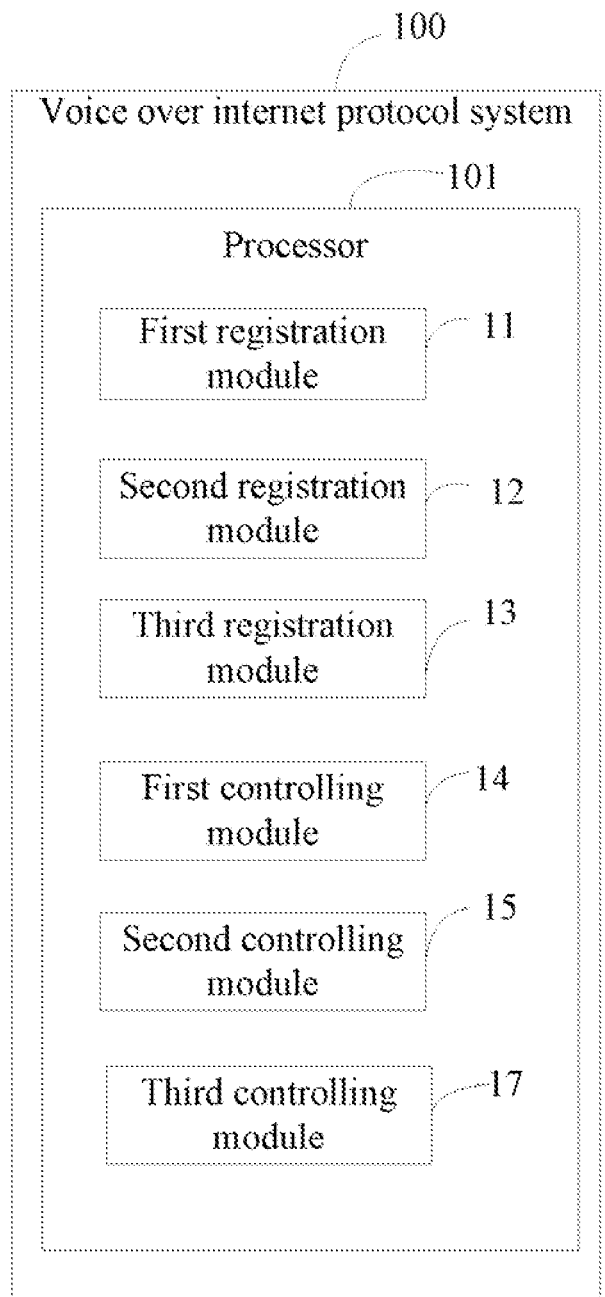
FIG. 2 is a block diagram of the hardware infrastructure of the voice over internet protocol system of FIG. 1, in accordance with an exemplary embodiment.

Referring to FIG. 2, the VOIP system 100 includes one or more processors 101 and a number of modules to be executed by the one or more processor 101. The number of modules includes a first registration module 11, a second registration module 12, a first controlling module 14, a second controlling module 15, a third registration module 13 and a third controlling module 17. The first registration module 11 generates a phone number for the first terminal device 101 and a domain name corresponding to the phone number of the first terminal device 101 according to a predefined rule, and transmits the domain name corresponding to the phone number and an IP address of the first terminal device 101 to the DDNS server 103 to be registered in the DDNS server 103. The first registration module 11 further generates a name of a group (e.g., "0944Group1") of the first terminal device 101 and a domain name (e.g., "0944Group1.myvoip.net") corresponding to the name of the group of the first terminal device 101 according to the predefined rule, and transmits the domain name corresponding to the name of the group and the IP address of the first terminal device 101 to the DDNS server 103 to be registered in the DDNS server 103. In one embodiment, each terminal device 101, 102, and 104 converts a media access control (MAC) address of each terminal device 101, 102, and 104 into a phone number for each terminal device 101, 102, and 104 according to a hash function. The hash function is applied to the last six numbers of the MAC address. The predefined rule includes combining the phone number with a predefined string such as ".myvoip.net" to form a called domain name. For example, if the respective MAC addresses of the terminal devices 101, 102 are 11:12:31:23 and 11:45:64:56, then the phone numbers allocated to the terminal devices 101, 102 are respectively 123123 and 456456. If an area code is 918, then the final phone numbers of the terminal devices 101, 102 will be, respectively, 918123123 and 918456456. Accordingly, the respective domain names of the terminal devices 101, 102 may be "918123123.myvoip.net" and "918456456.myvoip.net".

The second registration module 12 generates a phone number of each of the at least one second terminal devices 102 and a domain name corresponding to the phone number of the second terminal device 102 according to the predefined rule, and transmits the domain name corresponding to the phone number and an IP address of the second terminal device 102 to the DDNS server 103 to be registered in the DDNS server 103. The second registration module 12 further acquires the domain name corresponding to the name of the group of the first terminal device 101, and transmits the acquired domain name corresponding to the name of the group of the first terminal device 101 and IP address of the second terminal device 102 to the DDNS server 103 to be registered in the DDNS server 103. In one embodiment, the first registration module 11 runs in the first terminal device 101, and the second registration module 12 runs in the second terminal device 102.

The first controlling module 14 controls the second terminal device 102 to send a group applying request for applying to join in the group which includes the first terminal device 101, to the first terminal 101. The second controlling module 15 controls the first terminal device 101 to receive the group applying request from the second terminal device 102, and to send the domain name corresponding to the name of the group of the first terminal device 101 to the second registration module 12 in response to the received group applying request.

In a first embodiment, the second controlling module 15 further controls the first terminal device 101 to generate a name of the group of the first terminal device 101, and the domain name corresponding to the name of the group of the first terminal device 101 according to the predefined rule, transmit the domain name corresponding to the name of the group of the first terminal device 101 and an IP address of the first terminal device 101 to the DDNS server 103 to be registered in the DDNS server 103, and to send the domain name corresponding to the name of the group of the first terminal device 101 to the second registration module 12 in response to the received group applying request. In a second embodiment, the second controlling module 15 further detects whether the first terminal device 101 is part of a group, controls the first terminal device 101 to generate a name of the group of the first terminal device 101 and the domain name corresponding to the name of the group according to the predefined rule when the first terminal device 101 is not part of a group, transmit the domain name corresponding to the name of the group and an IP address of the first terminal device 101 to the DDNS server 103 to be registered in the DDNS server 103, and to send the domain name corresponding to the name of the group of the first terminal device 101 to the second registration module 12 in response to the received group applying request.

The third registration module 13 generates a phone number of each of the at least one third terminal devices 104 and a domain name corresponding to the phone number of the third terminal device 104 according to the predefined rule, and transmits the domain name corresponding to the phone number and an IP address of the third terminal device 104 to the DDNS server 103 to be registered in the DDNS server 103. The third controlling module 17 controls the third terminal device 104 to acquire the phone number of the first terminal device 101, to generate the domain name corresponding to the phone number of the first terminal device 101 according to the predefined rule, to search the IP address of the first terminal device 101 associated with the domain name corresponding to the phone number of the first terminal device 101 in the DDNS server 103, and to send a call request to the searched IP address of the first terminal device 101 when the third terminal device 104 calls the first terminal device 101. The second controlling module 15 controls the first terminal device 101 to receive the call request from the third terminal device 104, to search for the group which contains the first terminal device 101 based on the received call request, to acquire the IP address of the second terminal devices 102 within the group which has been found, and to send the call request to the second terminal devices 102 according to the acquired IP address. The first controlling module 14 further controls one of the second terminal devices 102 which receives the call request to send a call-received notification to other second terminal devices 102 which do not receive the call request, and to transmit the IP address of the second terminal devices 102 which do receive the call request to the first terminal device 101. The second controlling module 15 controls the first terminal device 101 to receive the IP address of the second terminal device 102, and to transmit the IP address of the second terminal device 102 to the third terminal device 104. The third controlling module 17 further controls the third terminal device 104 to receive the IP address of the second terminal device 102, and to send the call request to the second terminal device 102 according to the IP address. The first controlling module 14 further controls the second terminal device 102 to receive the call request from the third terminal device 104, and to transmit an open-for communication instruction to the third terminal device 104 based on the received call request. The third controlling module 17 further controls the third terminal device 104 to establish a communication connection with the second terminal device 102 when the third terminal device 104 receives the open-for communication instruction from the second terminal device 102. In one embodiment, the first controlling module 14 runs in the second terminal device 102, the second controlling module 15 runs in the first terminal device 101, and the third controlling module 17 runs in the third terminal device 104.

For example, there are three terminal devices B1, B2, and B3 within a group which is established by terminal device A, and when a terminal device C calls terminal device A within a VOIP network, the terminal device A transmits the call request to all of the three terminal devices B1, B2, and B3. When one of the three terminal devices B1, B2, and B3 receives the call request, the terminal device which receives the call request transmits a notification to the other terminal devices which do not receive the calling request to inform that a call request has been received; thereby preventing the other terminal devices from receiving the call request.

Figure 3:
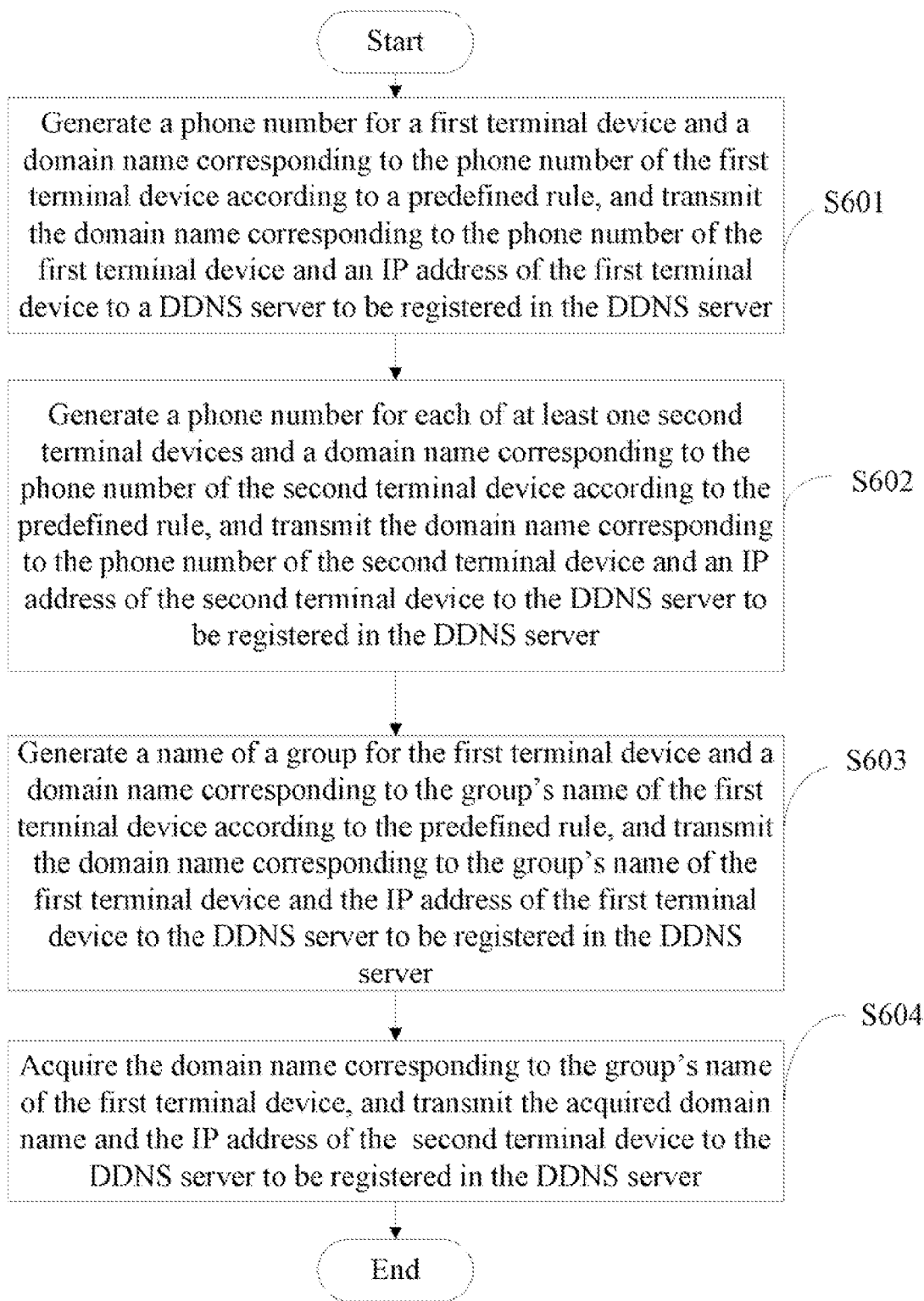
FIG. 3 is a flowchart of a voice over internet protocol method implemented by the voice over internet protocol system of FIG. 1, in accordance with an exemplary embodiment.

FIG. 3 is a flowchart of a voice over internet protocol method implemented by the voice over internet protocol system of FIG. 1, in accordance with an exemplary embodiment.

In step S601, the first registration module 11 generates a phone number of the first terminal device 101 and a domain name corresponding to the phone number of the first terminal device 101 according to a predefined rule, and transmits the domain name corresponding to the phone number of the first terminal device 101 and an IP address of the first terminal device 101 to the DDNS server 103 to be registered in the DDNS server 103.

In step S602, the second registration module 12 generates a phone number of each of the at least one second terminal devices 102 and a domain name corresponding to the phone number of the second terminal device 102 according to the predefined rule, and transmits the domain name corresponding to the phone number of the second terminal device 102 and an IP address of the second terminal device 102 to the DDNS server 103 to be registered in the DDNS server 103.

In step S603, the first registration module 11 further generates the name of a name of the group for the first terminal device 101 and a domain name corresponding to the name of the group of the first terminal device 101 according to the predefined rule, and transmits the domain name corresponding to the name of the group of the first terminal device 101 and the IP address of the first terminal device 101 to the DDNS server 103 to be registered in the DDNS server 103.

In step S604, the second registration module 12 acquires the domain name corresponding to the name of the group of the first terminal device 101, and transmits the acquired domain name corresponding to the name of the group of the first terminal device 101 and IP address of the second terminal device 102 to the DDNS server 103 to be registered in the DDNS server 103.

The method further includes the following substeps: the first controlling module 14 controls the second terminal device 102 to send a group applying request for applying to join in the group which contains the first terminal device 101. The second controlling module 15 controls the first terminal device 101 to receive the group applying request from the second terminal device 102, and to send the domain name corresponding to the name of the group of the first terminal device 101 to the second registration module 12 in response to the received group applying request.

In a first embodiment, the second controlling module 15 further controls the first terminal device 101 to generate a name of the group of the first terminal device 101 and the domain name corresponding to the name of the group of the first terminal device 101 according to the predefined rule, to transmit the domain name corresponding to the name of the group of the first terminal device 101 and an IP address of the first terminal device 101 to the DDNS server 103 to be registered in the DDNS server 103, and to send the domain name corresponding to the name of the group of the first terminal device 101 to the second registration module 12 in response to the received group applying request. In a second embodiment, the second controlling module 15 further detects whether the first terminal device 101 is part of a group, controls the first terminal device 101 to generate a name of the group of the first terminal device 101 and the domain name corresponding to the name of the group according to the predefined rule when the first terminal device 101 is not part of a group, to transmit the domain name corresponding to the name of the group and an IP address of the first terminal device 101 to the DDNS server 103 to be registered in the DDNS server 103, and to send the domain name corresponding to the name of the group of the first terminal device 101 to the second registration module 12 in response to the received group applying request.

The method further includes the following substeps: The third registration module 13 generates a phone number of the third terminal device 104 and a domain name corresponding to the phone number of the third terminal device 104 according to the predefined rule, and transmits the domain name corresponding to the phone number and an IP address of the third terminal device 104 to the DDNS server 103 to be registered in the DDNS server 103. The third controlling module 17 controls the third terminal device 104 to acquire the phone number of the first terminal device 101, to generate the domain name corresponding to the phone number of the first terminal device 101 according to the predefined rule, to search for the IP address of the first terminal device 101 which is associated with the domain name corresponding to the phone number of the first terminal device 101 in the DDNS server 103, and to send a call request to the searched IP address of the first terminal device 101 when the third terminal device 104 calls the first terminal device 101. The second controlling module 15 controls the first terminal device 101 to receive the call request from the third terminal device 104, to search for the group which contains the first terminal device 101 based on the received call request, to acquire the IP addresses of the second terminal devices 102 within the group which has been found, and to send the call request to the second terminal devices 102 according to the acquired IP addresses. The first controlling module 14 further controls the particular one of the second terminal devices 102 which receives the call request to send a call-received notification to the other second terminal devices 102 which do not receive the calling request, and to transmit the IP address of the second terminal device 102 which receives the call request to the first terminal device 101. The second controlling module 15 controls the first terminal device 101 to receive the IP address of the second terminal device 102, and to transmit the IP address of the second terminal device 102 to the third terminal device 104. The third controlling module 17 further controls the third terminal device 104 to receive the IP address of the second terminal device 102, and to send the call request to the second terminal device 102 according to the IP address. The first controlling module 14 further controls the second terminal device 102 to receive the call request from the third terminal device 104, and to transmit an open-for communication instruction to the third terminal device 104 based on the received call request. The third controlling module 17 further controls the third terminal device 104 to establish a communication connection with the second terminal device 102 when the third terminal device 104 receives the open-for communication instruction from the second terminal device 102.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A voice over internet protocol (VOIP) system to be applied among a first terminal device, at least one second terminal device, and a dynamic domain name service (DDNS), the VOIP system comprising:
   one or more processors executing one or more programs to:
      generate a phone number for the first terminal device and a domain name corresponding to the phone number of the first terminal device according to a predefined rule, and transmit the domain name corresponding to the phone number of the first terminal device and an IP address of the first terminal device to the DDNS server to be registered in the DDNS server;
      generate a phone number for each of the at least one second terminal device and a domain name corresponding to the phone number of the second terminal device according to the predefined rule, and transmit the domain name corresponding to the phone number of the second terminal device and an IP address of the second terminal device to the DDNS server to be registered in the DDNS server;
      generate a name of a group for the first terminal device and a domain name corresponding to the name of the group of the first terminal device according to the predefined rule, and transmit the domain name corresponding to the name of the group of the first terminal device and the IP address of the first terminal device to the DDNS server to be registered in the DDNS server; and
      acquire the domain name corresponding to the name of the group of the first terminal device, and transmit the acquired domain name corresponding to the name of the group of the first terminal device and the IP address of the second terminal device to the DDNS server to be registered in the DDNS server.

2. The VOIP system as described in claim 1, wherein the one or more processors further execute the one or more programs to:
   control the second terminal device to send a group applying request for applying to join in the group which comprises the first terminal device, to the first terminal device; and
   control the first terminal device to receive the group applying request from the second terminal device and to send the domain name corresponding to the name of the group of the first terminal device to the second registration module in response to the received group applying request.

3. The VOIP system as described in claim 2, wherein the one or more processors further execute the one or more programs to:
   control the first terminal device to generate a name of a group of the first terminal device and the domain name corresponding to the name of the group of the first terminal device according to the predefined rule, to transmit the domain name corresponding to the name of the group of the first terminal device and the IP address of the first terminal device to the DDNS server to be registered in the DDNS server, and to send the domain name corresponding to the name of the group of the first terminal device to the second registration module in response to the received group applying request.

4. The VOIP system as described in claim 2, wherein the one or more processors further execute the one or more programs to:
   detect whether the first terminal device is part of a group, to control the first terminal device to generate a name of the group of the first terminal device when the first terminal device is not part of a the group and the domain name corresponding to the name of the group of the first terminal device according to the predefined rule, to transmit the domain name corresponding to the name of the group of the first terminal device and the IP address of the first terminal device to the DDNS server to be registered in the DDNS server, and to send the domain name corresponding to the name of the group of the first terminal device to the second registration module in response to the received group applying request.

5. The VOIP system as described in claim 1, wherein the VOIP system is further to be applied at least one third terminal device, and the one or more processors further execute the one or more programs to:
generate a phone number for each of the at least one third terminal device and a domain name corresponding to the phone number of the third terminal device according to the predefined rule, and transmit the domain name corresponding to the phone number of the third terminal device and the IP address of the third terminal device to the DDNS server to be registered in the DDNS server;
control the third terminal device to acquire the phone number of the first terminal device, to generate the domain name corresponding to the phone number of the first terminal device according to the predefined rule, to search for the IP address of the first terminal device associated with the domain name in the DDNS server, and to send a call request to the searched IP address of the first terminal device when the third terminal device calls the first terminal device; and
control the first terminal device to receive the call request from the third terminal device, to search for the group which comprises the first terminal device according to the call request, to acquire the IP address of the second terminal devices within the group which has been group, and to send the call request to the second terminal devices according to the acquired IP address.

6. The VOIP system as described in claim 5, wherein the one or more processors further execute the one or more programs to:
control one of the second terminal devices which receives the call request to send a call-received notification to other second terminal devices which do not receive the call request, and to transmit an IP address of the second terminal devices which do receive the call request to the first terminal device;
control the first terminal device to receive the IP address of the second terminal device, and transmit the IP address to the third terminal device;
control the third terminal device to receive the IP address of the second terminal device, and send the call request to the second terminal device according to the received IP address;
control the second terminal device to receive the call request from the third terminal device, and to transmit an open-for communication instruction to the third terminal device based on the received call request; and
control the third terminal device to establish a communication connection with the second terminal device when the third terminal device receives the open-for communication instruction from the second terminal device.

7. The VOIP system as described in claim 1, wherein the predefined rule comprises combining the phone number and a predefined string to form the domain name.

8. A voice over internet protocol (VOIP) method implemented by a VOIP system which comprises one or more processors to execute a plurality of steps, wherein the plurality of steps comprises:
generating a phone number for a first terminal device and a domain name corresponding to the phone number of the first terminal device according to a predefined rule, and transmitting the domain name corresponding to the phone number of the first terminal device and an IP address of the first terminal device to a dynamic domain name service (DDNS) server to be registered in the DDNS server;
generating a phone number for each of at least one second terminal device and domain name corresponding to the phone number of the second terminal device according to the predefined rule, and transmitting the domain name corresponding to the phone number of the second terminal device and an IP address of the second terminal device to the DDNS server to be registered in the DDNS server;
generating a name of a group of the first terminal device and a domain name corresponding to the name of the group of the first terminal device according to the predefined rule, and transmitting the domain name corresponding to the name of the group of the first terminal device and the IP address of the first terminal device to the DDNS server to be registered in the DDNS server; and
acquiring the domain name corresponding to the name of the group of the first terminal device, and transmitting the acquired domain name and IP address of the at least one second terminal device to the DDNS server to be registered in the DDNS server.

9. The VOIP method as described in claim 8, wherein the plurality of steps further comprises:
controlling the second terminal device to send a group applying request for applying to join in the group which comprises the first terminal device, to the first terminal device; and
controlling the first terminal device to receive the group applying request from the second terminal device and to send the domain name corresponding to the name of the group of the first terminal device to the second terminal device in response to the received group applying request.

10. The VOIP method as described in claim 9, wherein the plurality of steps further comprises:
controlling the first terminal device to generate a name of the group of the first terminal device, to generate the domain name corresponding to the name of the group of the first terminal device according to the predefined rule, to transmit the domain name corresponding to the name of the group of the first terminal device and an IP address of the first terminal device to the DDNS server to be registered in the DDNS server, and to send the domain name corresponding to the name of the group of the first terminal device to the second terminal device in response to the received group applying request.

11. The VOIP method as described in claim 9, wherein the plurality of steps further comprises:
detecting whether the first terminal device is part of a group, and controlling the first terminal device to generate a name of the group of the first terminal device when the first terminal device is not part of the group and the domain name corresponding to the name of the group of the first terminal device according to the predefined rule, to transmit the domain name corresponding to the name of the group of the first terminal device and the IP address of the first terminal device to the DDNS server to be registered in the DDNS server, and to send the domain name corresponding to the name of the group of the first terminal device to the second terminal device in response to the received group applying request.

12. The VOIP method as described in claim 8, wherein the plurality of steps further comprises:

generating a phone number for each of at least one third terminal device and a domain name corresponding to the phone number of the third terminal device according to the predefined rule, and transmitting the domain name corresponding to the phone number of the third terminal device and an IP address of the third terminal device to the DDNS server to be registered in the DDNS server;

controlling the third terminal device to acquire the phone number of the first terminal device, to generate the domain name corresponding to the phone number of the first terminal device according to the predefined rule, to search for the IP address of the first terminal device associated with the domain name in the DDNS server, and to send a call request to the first terminal device according to the searched IP address when the third terminal device calls the first terminal device; and controlling the first terminal device to receive the call request from the third terminal device, to search for the group which comprises the first terminal device according to the received call request, to acquire the IP address of the second terminal devices within the group which has been found, and to send the call request to the second terminal devices according to the acquired IP address.

13. The VOIP method as described in claim 12, wherein the plurality of steps further comprises:

controlling one of the terminal devices which receives the call request to send a call-received notification to other second terminal devices which do not receive the call request, and to transmit an IP address of the second terminal devices which do receives the call request to the first terminal device;

controlling the first terminal device to receive the IP address of the second terminal device, and transmit the IP address to the third terminal device;

controlling the third terminal device to receive the IP address of the second terminal device, and send the call request to the second terminal device according to the IP address;

controlling the second terminal device to receive the call request from the third terminal device, and to transmit an open-for communication instruction to the third terminal device based on the received call request; and controlling the third terminal device to establish a communication connection with the second terminal device when the third terminal device receives the open-for communication instruction from the second terminal device.

14. The VOIP method as described in claim 8, wherein the predefined rule comprises combining the phone number and a predefined string to form the domain name.

* * * * *